(12) United States Patent
Bastos et al.

(10) Patent No.: US 7,825,936 B1
(45) Date of Patent: Nov. 2, 2010

(54) METHOD AND SYSTEM FOR TEXTURE INSTRUCTION DEMOTION OPTIMIZATION

(75) Inventors: Rui M. Bastos, Alegre (BR); Jakob Nebeker, San Jose, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1049 days.

(21) Appl. No.: 10/993,700

(22) Filed: Nov. 19, 2004

(51) Int. Cl.
G09G 5/00 (2006.01)
G06T 1/00 (2006.01)

(52) U.S. Cl. .................. 345/582; 345/522; 345/607; 345/612

(58) Field of Classification Search .......... 345/426, 345/427, 582, 607, 522, 612
See application file for complete search history.

(56) References Cited

U.S. PATENT DOCUMENTS

| | | | |
|---|---|---|---|
| 4,901,064 A | 2/1990 | Deering | |
| 5,764,228 A | 6/1998 | Baldwin | |
| 5,805,782 A * | 9/1998 | Foran | 345/426 |
| 5,821,950 A | 10/1998 | Rentschler et al. | |
| 6,351,681 B1 | 2/2002 | Chih et al. | |
| 6,532,013 B1 * | 3/2003 | Papakipos et al. | 345/426 |
| 6,791,559 B2 | 9/2004 | Baldwin | |
| 6,925,520 B2 | 8/2005 | Ma et al. | |
| 6,940,512 B2 | 9/2005 | Yamaguchi et al. | |
| 7,098,924 B2 * | 8/2006 | Prokopenko et al. | 345/581 |
| 2003/0164830 A1 | 9/2003 | Kent | |
| 2004/0008200 A1 | 1/2004 | Naegle et al. | |
| 2004/0012596 A1 | 1/2004 | Allen et al. | |
| 2006/0238535 A1 | 10/2006 | Goel et al. | |

FOREIGN PATENT DOCUMENTS

WO 01/71519 9/2001

OTHER PUBLICATIONS

K Proudfoot, W. Mark, S. Tzvetkov, P. Hanrahan. "A Real-Time Procedural Shading System for Programmable Graphics Hardware." ACM SIGGRAPH 2001, pp. 159-170.
Matt Buckelew, "RealiZm Graphics," IEEE Comp. Soc. Press, Feb. 1997 Proceedings of IEEE CompCon '97, San Jose: pp. 192-197.

* cited by examiner

*Primary Examiner*—Hau H Nguyen

(57) ABSTRACT

A method and system for optimizing graphics program execution by allowing the sharing of shader resources is disclosed. The method includes accessing a graphics program using a shader pipeline. If a texture projective instruction is included in the graphics program, a determination is made as to whether a texture projective parameter q indicates a non-projective texture. If the texture projective parameter indicates a non-projective texture, the texture projective instruction is demoted and a resulting demoted texture instruction is executed using a plurality of interpolators of the shader pipeline, which requires fewer shader resources.

21 Claims, 5 Drawing Sheets

METHOD AND SYSTEM FOR TEXTURE INSTRUCTION DEMOTION OPTIMIZATION

FIELD OF THE INVENTION

The present invention relates to computer graphic systems, and more particularly to computer graphics shaders.

BACKGROUND OF THE INVENTION

Graphics processing is an important feature of modern high performance computing systems. In graphic processing, mathematical procedures are implemented to render, or draw, graphic primitives, e.g., a triangle or a rectangle, on a display to produce desired visual images. Real time graphics processing is based on the high speed processing of graphic primitives to produce visually pleasing moving images. Early graphic systems were limited to displaying image objects comprised of graphic primitives having smooth surfaces. That is, visual textures, bumps, scratches, or other surface features were not modeled in the graphics primitives. To enhance image quality, texture mapping of real world attributes was introduced. In general, texture mapping is the mapping of an image onto a graphic primitive surface to create the appearance of a complex image without the high computational costs associated with rendering actual three dimensional details of an object.

Graphics processing is typically performed using graphics application program interfaces (API's) that provide a standard software interface that can be run on multiple platforms, operating systems, and hardware. Examples of graphics API's include the Open Graphics Library (OpenGL®) and D3D™. In general, such open graphics application programs include a predetermined, standardized set of commands that are executed by associated hardware. For example, in a computer system that supports the OpenGL® standard, the operating system and application software programs can make calls according to that standard without knowing any of the specifics regarding the system hardware. Application writers can use graphics APIs to design the visual aspects of their applications without concern as to how their commands will be implemented.

Graphics APIs are particularly beneficial when they are supported by dedicated graphics hardware. In fact, high speed processing of graphical images is often performed using special graphics processing units (GPUs) that are fabricated on semiconductor substrates. Beneficially, a GPU can be designed and used to rapidly and accurately process graphics commands with little impact on other system resources.

FIG. 1 illustrates a simplified block diagram of a graphics system 100 that includes a graphics processing unit 102. As shown, that graphics processing unit 102 has a host interface/front end 104. The host interface/front end 104 receives raw graphics data from central processing hardware 103 that is running an application program stored in memory 105. The host interface/front end 104 buffers input information and supplies that information to a geometry engine 106. The geometry engine 106 produces, scales, rotates, and projects three dimensional vertices of graphics primitives in "model" coordinates into 2 dimensional frame buffer coordinates. Typically, triangles are used as graphics primitives for three dimension objects, but rectangles are often used for 2-dimensional objects (such as text displays).

The 2 dimensional frame buffer co-ordinates of the vertices of the graphics primitives from the geometry engine 106 are applied to a rasterizer 108. The rasterizer 108 determines the positions of all of the pixels within the graphics primitives. This is typically performed along raster (horizontal) lines that extend between the lines that define the graphics primitives. The rasterizer 108 also generates interpolated colors, depths and other texture coordinates for each pixel. The output of the rasterizer 108 is referred to as rasterized pixel data.

The rasterized pixel data are applied to a shader 110 that adds texture and optical features related to fog and illumination to the rasterized pixel data to produce shaded pixel data. The shader 110 includes a texture engine 112 that modifies the rasterized pixel data to have desired texture and optical features. The texture engine 112 can be implemented using a hardware pipeline that can process large amounts of data at very high speed. The shaded pixel data is input to a Raster Operations Processor 114 (Raster op in FIG. 1) that performs vertex processing on the shaded pixel data. The result from the Raster Operations Processor 114 is frame pixel data that is stored in a frame buffer memory 120 by, a frame buffer interface 116. The frame pixel data can be used for various processes such as being displayed on a display 122. Frame pixel data can be made available as required by way of the frame buffer interface 116.

Hardwired pipeline shaders 110 are known. For example, hardwired pixel pipelines have been used to perform standard API functions, including such functions as scissor, Alpha test; zbuffer, stencil, blendfunction; logicop; dither; and writemask. Also known are programmable shaders 110 that enable an application writer to control shader operations. For example, reference U.S. patent application Ser. No. 10/391, 930, filed on Mar. 19, 2003, and entitled "System Method and Computer Program Product for Branching During Programmable Vertex Processing," by Lindholm et al.; U.S. patent application Ser. No. 09/586,249, filed on May 31, 2000, and entitled "System Method and Article of Manufacture for Programmable Vertex Processing Model with Instruction Set," by Lindholm et al.; and U.S. patent application Ser. No. 09/273,975, filed on Mar. 22, 1999, and entitled "Programmable Pixel Shading Architecture," by Kirk et al., all of which are hereby incorporated by reference in their entirety.

Programmable shaders enable flexibility in the achievable visual effects and can reduce the time between a graphics function being made available and that function becoming standardized as part of a graphics API. Programmable shaders can have a standard API mode in which standard graphics API commands are implemented and a non-standard mode in which new graphics features can be programmed.

While shaders have proven themselves to be useful, demands for shader performance have exceeded the capabilities of existing shaders. While improving existing shaders could address some of the demands, such improvements would be difficult to implement. Furthermore, future demands can be anticipated to exceed the capabilities achievable by improved existing shaders. Therefore, a new method of improving shader performance would be beneficial.

SUMMARY OF THE INVENTION

Embodiments of the present invention provide a method and system for optimizing graphics program execution using shader processing hardware. Embodiments of the present invention improved shader performance by advantageously demoting texture instructions as graphics data conditions allow.

In one embodiment, the present invention is implemented as a method for optimizing graphics program execution. The method includes accessing a graphics program (e.g., a shader program) using a shader pipeline. If a texture projective instruction (e.g., a TXP instruction) is included in the graphics program (e.g., for a projective texture into a 3-D scene), a determination is made as to whether a texture projective parameter q is equal to one across a polygon. If the texture projective parameter q is equal to one across the polygon, the texture projective instruction is demoted into a non-projective texture instruction (e.g., a TEX instruction). The non-projective texture instruction can execute much more efficiently on parallel interpolation hardware in comparison to the projective texture instruction. Once demoted, the resulting non-projective texture instruction is executed using a plurality of interpolators of the shader pipeline.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

The principles of the present invention provide for a new, scalable, and programmable graphics shader architecture. A graphics shader that is in accord with that architecture includes multiple shader pipelines that can be programmed to perform graphical processing operations on rasterized pixel data. One or more shader pipelines can be functionally disabled while still maintaining the functionality of the shader. This enables reduced chip rejections. Such a graphics shader includes a shader distributor that applies rasterized pixel data, albeit processed rasterized pixel data, to the various shader pipelines, beneficially in a manner that balances their workloads. A shader collector collects and organizes the shader pipeline outputs into proper order to produce shaded pixel data. A shader instruction processor programs the individual shader pipelines to perform their intended tasks. Some embodiments can make use of multiple shader instruction processors, such as having one shader instruction processor for each shader pipeline.

Each shader pipeline can be programmed to execute a distinct set of program commands. Those commands can include branching instructions, texture processing, and mathematical operations using floating-point, fixed-point, and/or integer values. Each shader pipeline includes a shader gatekeeper that interacts with the shader distributor and with the shader instruction processor such that data that passes through the shader pipelines is processed as required.

Figure 1:
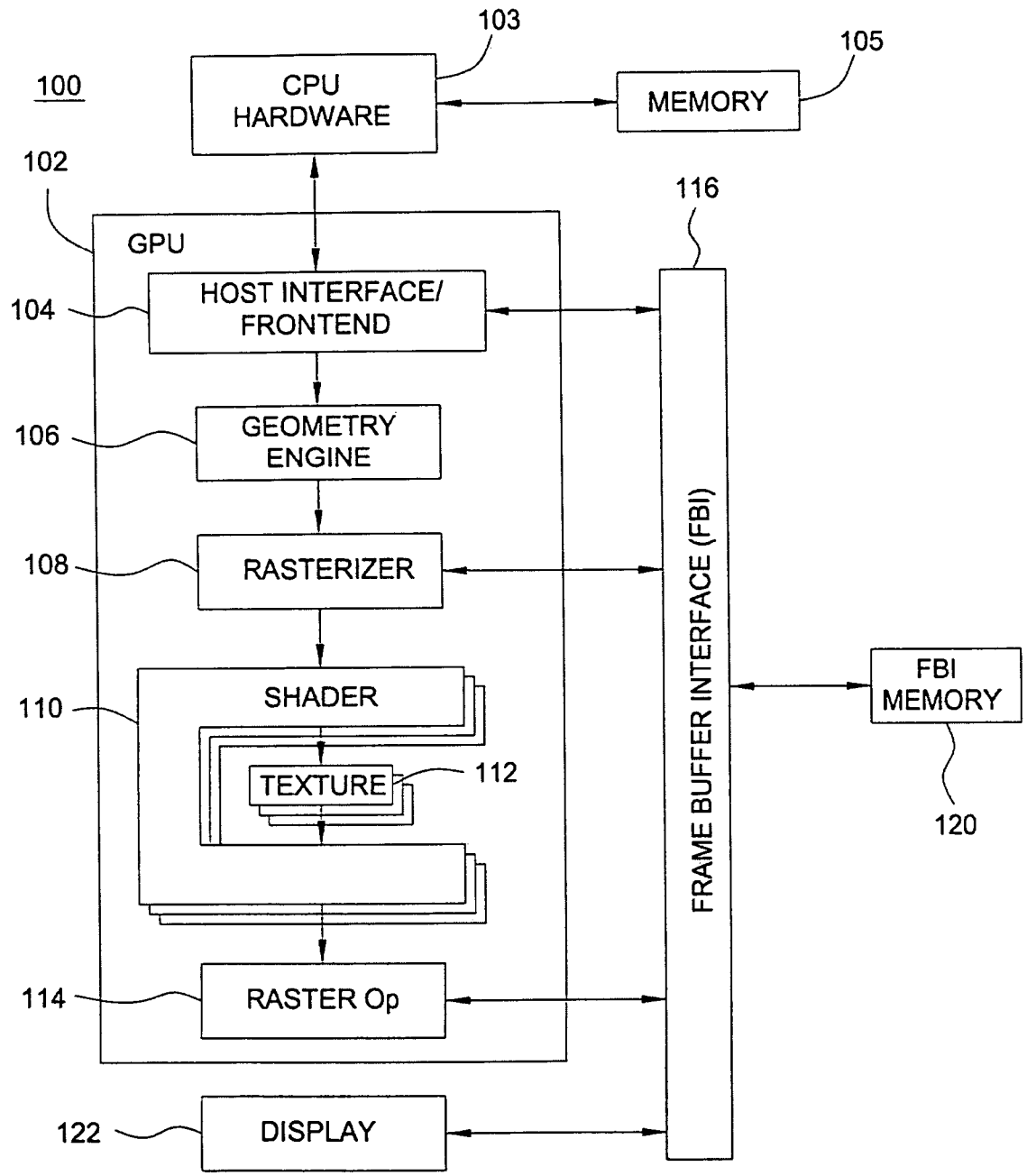
FIG. 1 illustrates a simplified block diagram of a graphics system that includes a graphics processing unit.
Figure 2A:
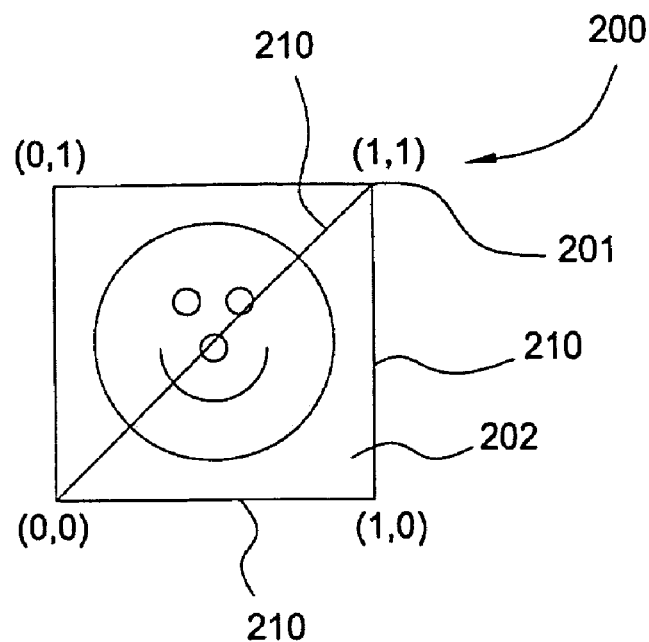
FIG. 2A illustrates the coordinates (0,0), (1,0), and (1,1) of the vertices that define a graphic primitive triangle in accordance with one embodiment of the present invention.

To better understand the new graphics architecture it may be helpful to understand its functions in more detail. Referring back to FIG. 1, the input to a shader are 2-dimensional display co-ordinates of the vertices of the graphics primitives used in the graphics system. Typically, those graphic primitives are triangles. For example, FIG. 2A illustrates the coordinates (0,0), (1,0), and (1,1) of the vertices that define a graphic primitive triangle 202. If rectangles are used, the additional coordinate (0,1) would be included in the graphics primitive. However, except for 2-dimension objects such as text, triangles are more common.

Figure 2B:
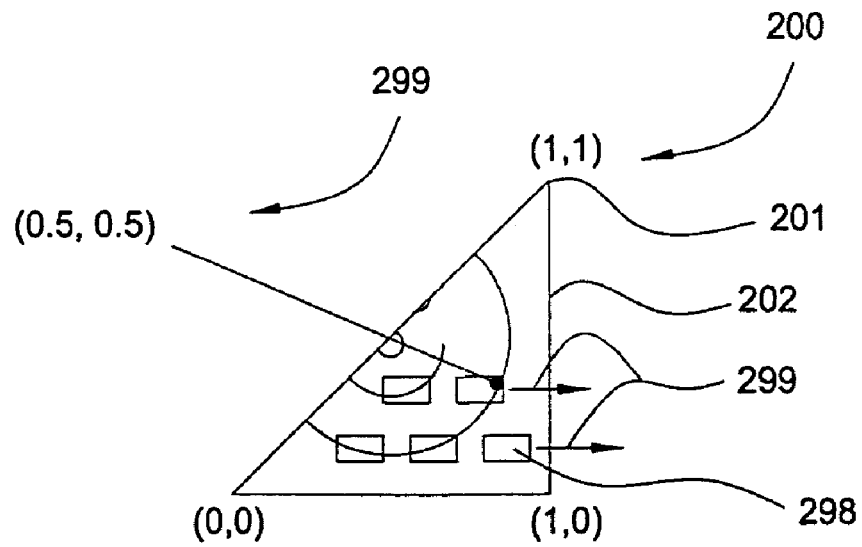
FIG. 2B illustrates a plurality of pixels within the triangle that are aligned by scan lines in accordance with one embodiment of the present invention.

Once the vertices 201 of the triangle 202 are known, the pixels within the graphic primitive are determined since they are the pixels located between the lines 210 that form the graphic primitive. Usually the pixels are organized along raster scan lines. For example, FIG. 2B illustrates a plurality of pixels 298 within the triangle 202 that are aligned by scan lines 299.

Figure 3:
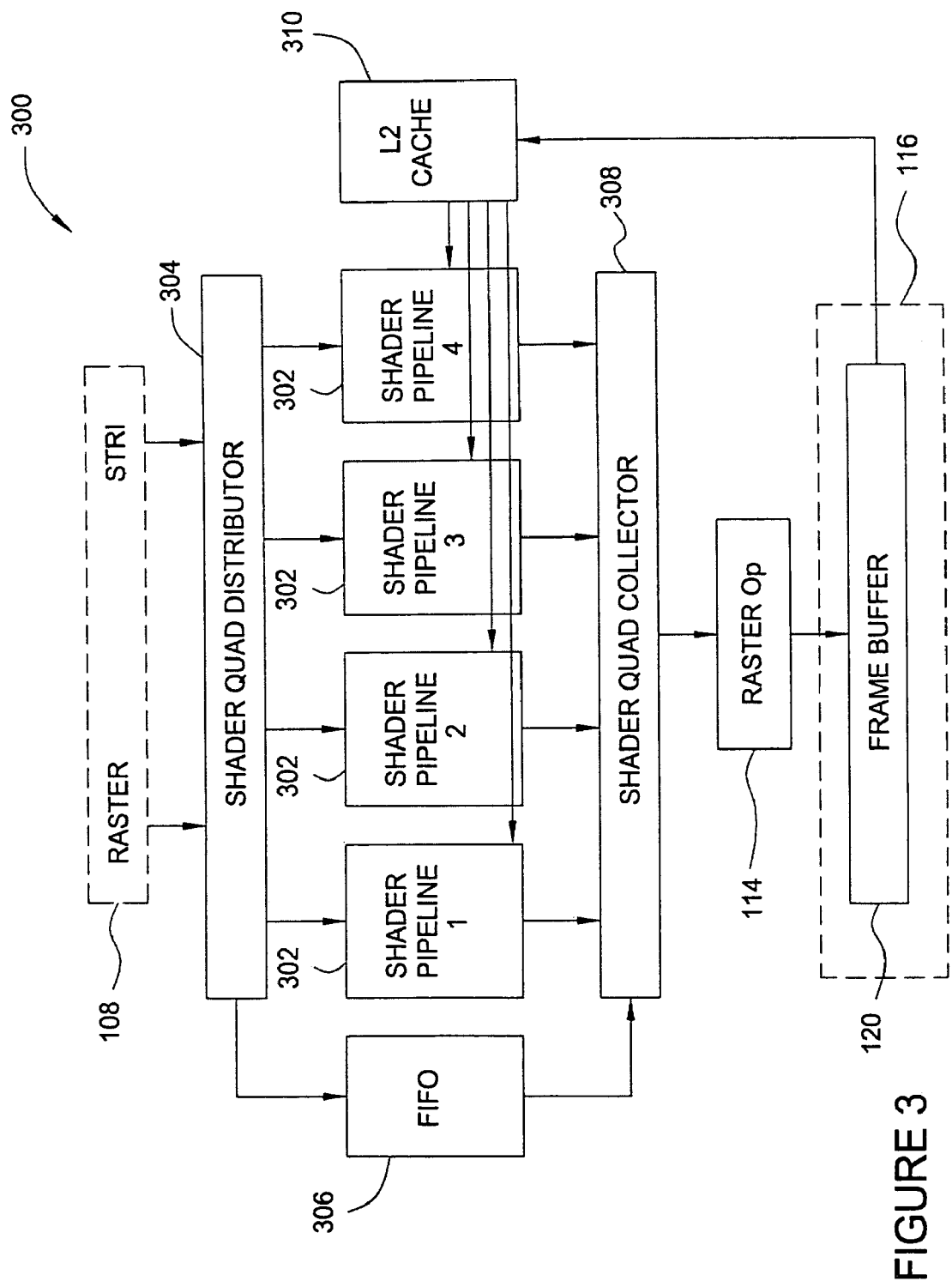
FIG. 3 is a high-level block diagram of a shader having a shader architecture in accordance with one embodiment of the present invention.

FIG. 3 is a high-level block diagram of a shader 300 having a shader architecture that is in accord with the principles of the present invention. The shader 300 represents a new, useful, and unobvious embodiment of the generic shader 102 of FIG. 1. Similarly, the graphics system 100 can comprise the graphics functionality of a GPU (e.g., GPU 510 of FIG. 5) of a computer system (e.g., computer system 500) in accordance with one embodiment of the present invention.

In the FIG. 3 embodiment, the purpose of the shader 300 is to convert the rasterized pixel data (which has raw color, depth, and texture information) from the rasterizer 108 into an appropriate color and depth value for each display pixel. To do so, the shader 300 executes large numbers of calculations to resolve mathematical equations in response to graphics API functions and in response to application program commands to produce the desired color and depth values to form shaded pixel data. After vertex processing by the Raster Operations Processor, the shaded pixel data is converted into frame pixel data that is stored by the frame buffer interface 116 in the frame memory 120 (reference FIG. 1).

A notable feature of the shader 300 is its multiple shader pipelines 302. While the shader 300 is shown as having four shader pipelines 302, there could, in general, be from 1 to N shader pipelines 302, where N is an integer. This scalability can be used to control graphical processing power by simply adding/subtracting shader pipelines. Furthermore, such scalability enables shader pipeline 302 redundancy, which, in turn, enables the ability to functionally disable defective shader pipelines 302 while still maintaining the overall operation of the shader 300. Since the shader pipelines 302 are beneficially identical, it is a relatively simple task to fabricate additional shader pipelines 302 as required since the same masks and semiconductor fabrication processes can be used.

The shader 300 also includes a shader quad distributor 304. One function of the shader quad distributor 304 is to distribute information from the rasterizer 108 (rasterized pixel data) to the various shader pipelines 302. Beneficially this distribution is performed in a manner that provides for a balanced workload between the shader pipelines 302. That is, the shader pipeline 302 performs similar amounts of processing. Another function of the shader quad distributor 304 is to process the data from the rasterizer 108 such that the shader pipelines 302 only receive the portions of the rasterized pixel data that they require both fragment and state data.

Portion of the state data coming from the rasterizer that is not used by the shader pipelines 302 are applied by the shader quad distributor 304 to a first-in-first-out buffer memory 306. Besides the state data, which is not needed by the shader pipelines 302, the first-in-first-out buffer memory 306 also receives the X-Y coordinate and pixel coverage data, which also do not go through the shader pipelines 302. Because the shader pipelines 302 independently process data, the outputs of the shader pipelines 302 have to be organized in such a manner that the resulting textured pixel data is properly matched with the pixels in the frame buffer (by raster scan lines). The shader 300 therefore includes a shader quad collector 308 that receives the outputs of the shader pipelines 302 and the outputs of the first-in-first-out buffer memory 306, and that organizes the results of the shader operations to produce shaded pixel data for the Raster Operations Processor 114 (ROP).

The output of the shader quad collector 308 is applied via the frame buffer interface 116 to the frame buffer memory 120, and thus to the display 122. Since the shader pipelines 302 are high-speed devices that require temporary storage of intermediate data, the shader 300 includes an L2 cache memory 310.

The high-level diagram 300 illustrates a shader architecture that is in accord with the principles of the present invention. That architecture provides for multiple shader pipelines, a shader that distributes graphics data to multiple shader pipelines, that collects the computation results of the shader pipelines, and then organizes the shader pipeline results to form shaded pixel data for use by the ROP 114 that vertex processes the shaded pixel data to form frame buffer data. That frame buffer data can optionally be displayed.

Additional descriptions of a shader architecture in accordance with one embodiment of the present invention can be founded in the commonly assigned patent application GRAPHICS SHADER ARCHITECTURE, Ser. No. 10/938,042, by Bastos et al., filed on Sep. 10, 2004, which is incorporated herein in its entirety.

Figure 4:
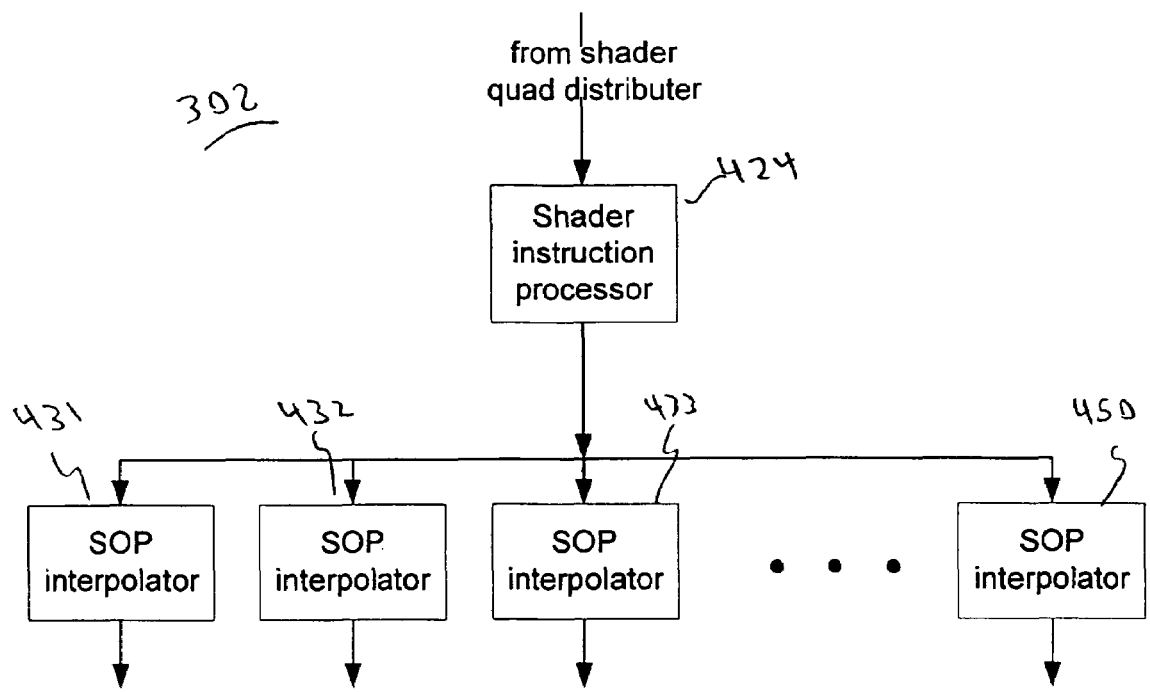
FIG. 4 shows a diagram illustrating internal components of the shader pipeline in accordance with one embodiment of the present invention.

FIG. 4 shows a diagram illustrating internal components of the shader pipeline 302 in accordance with one embodiment of the present invention. As depicted in FIG. 4, the shader pipeline 302 includes a shader instruction processor (SIP) 424 coupled to receive graphics primitives and data from the shader quad distributor 304. The shader instruction processor 424 is configured to allocate graphics primitives and data to a plurality of "sum of products" (SOP) interpolators 431-450.

In one embodiment, the present invention is implemented as an optimization method that improves the performance shader processing operations. Particularly, in one embodiment, the occurrence of texture projective instructions (e.g., TXP instructions) are processed in such a manner as to convert, or demote, one or more such texture projective instructions into more efficiently processed non-projective texture instructions (e.g., TEX instructions).

Generally, TXP instructions consume more resources during shader processing operations than TEX instructions, because, for a shader pass that includes a TXP instruction, the SOP interpolators 431-450, hereafter SOPs 431-450, cannot interpolate other perspective correct attributes. The SOPs 431-450 each comprise a specialized arithmetic unit configured to execute multiplication operations and then add the results (e.g., sum of products). The SOPs 431-450 are basically plane equation evaluators configured to interpolate attributes across a given triangle. The SOPs 431-450 provide the parallel hardware required to execute attribute interpolation in a parallel manner on a per-clock basis. The number of SOPs included in a given shader pipeline is dependent on the desired overall shader cost and performance. For example, a high performance shader pipeline could include 16 or more SOPs, while a smaller shader pipeline (e.g., lower gate count) could include 4 or fewer SOPs.

TEX instructions comprise basic texture instructions for mapping textures into a scene. When mapping a texture into a three-dimensional scene, the texture must be perspective corrected. Perspective correction involves computing the term $1/w$, where the w parameter basically corresponds to the distance from the eye to the object in the scene (e.g., the distance from the viewer's eye). For a non-projective texture, $1/w$ is computed, and is used to interpolate the texture attributes $s/w$, $t/w$.

TXP instructions comprise texture projective instructions. For a projective texture, the term $q/w$ is computed, and is used to interpolate the texture attributes $s/q$, $t/q$. The term q corresponds to the distance from the projector (e.g., light source) to the object. A projective texture generally occurs when projecting a texture onto a surface (e.g., a light/shadow, film strip, etc.) from a projector.

The processing of TXP instructions consumes more resources of the shader 302 than the processing of TEX instructions. For example, TXP instructions consume more resources because each projective texture will have its own q parameter. The difference is that a TXP instruction (projective TEX) requires interpolation of $q/w$. The term $q/w$ cannot be shared across the SOPs 431-450 when interpolating other attributes that need $1/w$. In contrast, a TEX instruction requires interpolation of $1/w$, which can be shared across the SOPs 431-450 when interpolating other attributes that need $1/w$. Other textures that are to be mapped into the scene that use $1/w$ can use the common computed term.

Thus, when $q/w$ is being computed for a TXP instruction, all of the SOPs 431-450 of the shader pipeline 302 are locked down. The pipeline 302 cannot be used to compute other attributes that need $1/w$ during that clock. The parallel hardware (e.g., the SOPs 431-450) is wasted. The term $1/q$ needs to be computed for each texture. This consumes a disproportionate amount of shader pipeline resources. The consequence is that programs that use TXP instructions potentially run slower than programs that use TEX instructions.

Embodiments of the present invention optimize this problem by implementing an auto-demotion of TXP instructions into TEX instructions. The auto-demotion of TXP instructions into TEX instructions provides data-dependent speedup of the shader processing operations.

In one embodiment, the GPU 102 includes hardware that detects when the parameter q is equal to 1 across a polygon. When q is 1, a normal texture perspective correction is being performed, in other words, a non-projective texture operation is occurring, even if the program is requesting a TXP instruction. OpenGL has many occurrences where q can be set to 1. The GPU 102 includes hardware configured to detect when q is set to 1 across a triangle. In that case, TXP is automatically demoted to TEX.

In one embodiment, the auto-demotion is implemented by the shader instruction processor 424. In such an embodiment, the vertex processing portion of the GPU 102 (e.g., the geometry engine 106) can test the q values for all the vertices of a primitive for each set of texture coordinates, and send one or more bits per texture coordinate to the shader instruction processor 424, with each bit indicating when an interpolated texture coordinate is guaranteed to have q=1.0. In addition, software controlled state (e.g., as managed by the graphics driver), can dictate TXP demotion. It should be noted that demotion can be implemented using software controlled state (e.g., graphics driver) or hardware controlled state (e.g., from vertex processing).

For example, the TXP demotion will turn on when each vertex of a triangle has a value of q=1.0 and will turn off when any q is anything else. q needs to be 1.0 for each vertex of the triangle. Since the shader instruction processor 424 schedules TXP instructions differently from TEX instructions, the same fragment program will execute with a variable number of shader passes, depending on when all 3 vertices of a triangle have q=1.0.

As a general TXP/SRB (shader remapper block) optimization rule, interpolation of perspectively-corrected attribute components should not be done in the same shader pass with interpolating texture coordinates for a TXP instruction. Rather, attribute components that are not perspectively corrected should be in the same shader pass with the TXP instruction. This is done to allow one SOP to interpolate 1/w or q/w without causing a change in how a fragment program is scheduled by the SIP 424.

To illustrate this optimization rule, the following example of part of a fragment program is shown below:

| TXP R | h4 f[TEX 0] |
|-------|-------------|
| MUL H | h4 f[COL 0] |

The fragment program requires one shader pass if the TXP instruction is demoted to a TEX instruction. The 1/w term can be shared across the SOPs 431-450 to interpolate other parameters. Here, interpolation of f[TEX 0] as texture coordinates and interpolation of diffuse color from f[COL 0] can be done in the same shader pass as shown below:

| Pass 1 | SOPs s/w, t/w, 1/w, a/w, b/w |
|--------|------------------------------|

The fragment program requires two shader passes if the TXP instruction is not demoted to a TEX instruction.

| Pass 1 | SOPs s/w, t/w, q/w |
|--------|--------------------|
| Pass 2 | SOPs a/w, b/w, 1/w |

Here, interpolation of f[TEX 0] as texture coordinates and interpolation of diffuse color from f[COL 0] require two shader passes.

It should be noted that in a highly SOP-constrained program, it may be impossible to re-arrange the instructions so as to avoid performance loss when a TXP instruction is not demoted. In that case, one shader pass will be added for every TXP instruction that is both: (a) scheduled in the same shader pass with perspectively-corrected attribute components that require 1/w interpolation; and (b) is not demoted. Alternatively, the graphics driver could determine when q=1, and have a compiler generate a fragment program that is optimal for that situation. The optimal fragment program could be different depending on whether q=1 is expected to occur or not.

Figure 5:
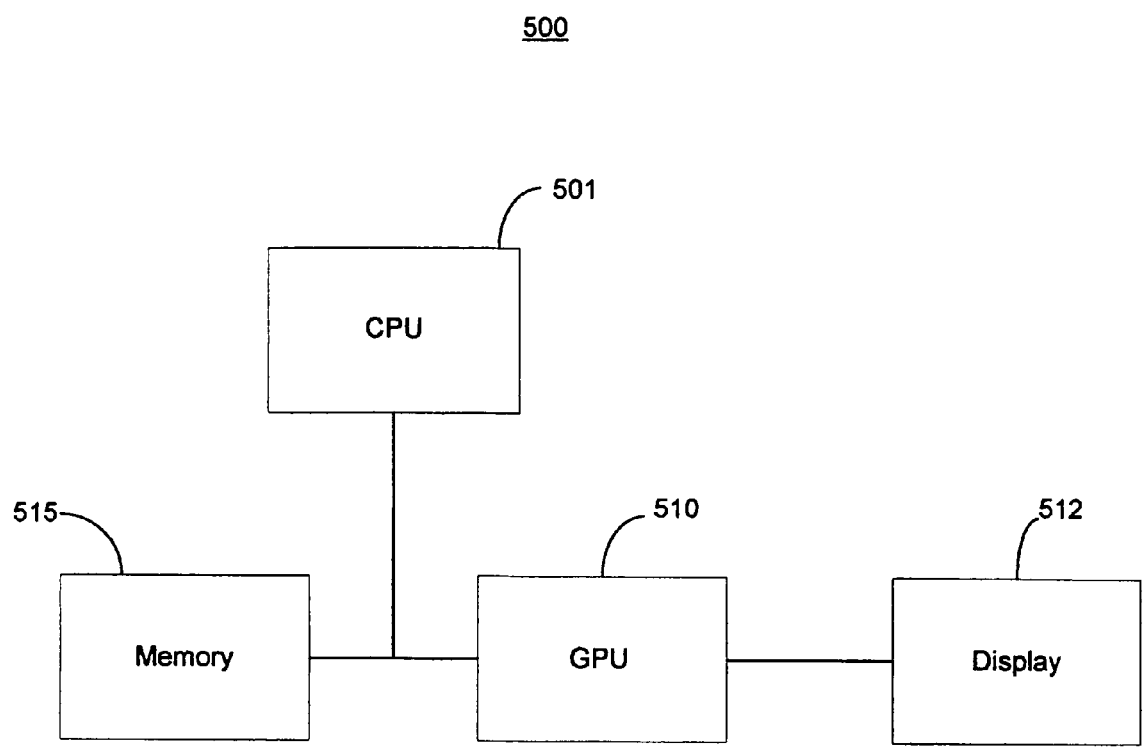
FIG. 5 shows a computer system in accordance with one embodiment of the present invention.

Computer System Platform:

FIG. 5 shows a computer system 500 in accordance with one embodiment of the present invention. Computer system 500 depicts the components of a basic computer system in accordance with one embodiment of the present invention that provides the execution platform for implementing certain hardware-based and software-based functionality of the present invention. As described above, certain processes and steps of the present invention are realized, in one embodiment, as a series of instructions (e.g., software program) that reside within computer readable memory units of a computer system (e.g., system 500) and are executed by the CPU of system 500. When executed, the instructions cause the computer system 500 to implement the functionality of the present invention as described above.

In general, computer system 500 comprises at least one CPU 501 coupled to a system memory 515 and a graphics processor unit (GPU) 510 via one or more busses as shown. Access to the system memory 515 is implemented by a memory controller 516. The GPU 510 is coupled to a display 512. System 500 can be implemented as, for example, a desktop computer system or server computer system, having a powerful general-purpose CPU 501 coupled to a dedicated graphics rendering GPU 510. In such an embodiment, components would be included that are designed to add peripheral buses, specialized graphics memory and system memory, 10 devices, and the like.

It should be appreciated that although the GPU 510 is depicted in FIG. 5 as a discrete component, the GPU 510 can be implemented as a discrete graphics card designed to couple to the computer system via a graphics port (e.g., AGP port, PCI Express port, or the like), as a discrete integrated circuit die (e.g., mounted directly on the motherboard), or as an integrated GPU included within the integrated circuit die of a computer system chipset component (e.g., integrated within a Northbridge chip). Additionally, a local graphics memory can be included for the GPU 510 (e.g., for high bandwidth graphics data storage). It should be noted that although the memory controller 516 is depicted as a discrete component, the memory controller 516 can be implemented as an integrated memory controller within a different component (e.g., within the CPU 501, GPU 510, etc.) of the computer system 500. Similarly, system 500 can be implemented as a set-top video game console device such as, for example, the Xbox®, available from Microsoft Corporation of Redmond, Wash.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for optimizing graphics program execution, comprising:

accessing a graphics program using a programmable shader pipeline of a GPU (graphics processor unit);

if a texture projective instruction is included in the graphics program, determining whether a texture projective parameter indicates a non-projective texture;

replacing the texture projective instruction with a demoted texture projective instruction when the parameter indicates a non-projective texture; and executing the demoted texture instruction using a plurality of interpolators of the shader pipeline.

2. The method of claim 1, wherein the texture projective instruction is a TXP instruction and the resulting demoted texture instruction is a TEX instruction.

3. The method of claim 1, wherein the interpolators of the shader pipeline comprise a plurality of sum of products interpolators.

4. The method of claim 3, wherein the sum of products interpolators are configured to interpolate per-vertex attributes, comprising texture coordinates and Barycentric coordinates, in parallel.

5. The method of claim 1, wherein the demoting of the texture projective instruction is configured to enable a parallel per-vertex attribute computation by the interpolators of the shader pipeline.

6. The method of claim 1, wherein a parallel per-vertex attribute computation is implemented in a single pass of the shader pipeline.

7. The method of claim 1, further comprising:
executing the texture projective instruction, wherein the texture projective instruction is not demoted when the parameter indicates a projective texture.

8. The method of claim 1, further comprising:
using a shader instruction processor to demote the texture projective instruction.

9. The method of claim 1, further comprising:
using a vertex processing portion of the GPU to determine whether the texture projective parameter indicates a non-projective texture.

10. A computer system for optimizing graphics program execution, comprising:
a graphics processor, the graphics processor having at least one programmable shader pipeline; and
a memory coupled to the graphics processor and having computer readable code which when executed by the graphics processor cause the graphics processor to implement a method comprising:
accessing a graphics program using the shader pipeline;
if a texture projective instruction is included in the graphics program; determining whether a texture projective parameter is equal to 1 across a polygon by checking a per-vertex parameter value;
replacing the texture projective instruction with a demoted texture projective instruction when the parameter is equal to 1 across a polygon; and
executing the demoted texture instruction using a plurality of interpolators of the shader pipeline.

11. The computer system of claim 10, wherein the texture projective instruction is a TXP instruction and the resulting demoted texture instruction is a TEX instruction.

12. The computer system of claim 10, wherein the interpolators of the shader pipeline comprise a plurality of sum of products interpolators.

13. The computer system of claim 12, wherein the sum of products interpolators are configured to interpolate texture attributes in parallel.

14. The computer system of claim 10, wherein the demoting of the texture projective instruction is configured to enable a parallel texture attribute computation by the interpolators of the shader pipeline.

15. The computer system of claim 10, wherein a parallel texture attribute computation is implemented in a single pass of the shader pipeline.

16. The computer system of claim 10, further comprising:
executing the texture projective instruction, wherein the texture projective instruction is not demoted when the parameter is not equal to 1 across a polygon.

17. The computer system of claim 10, further comprising:
using a shader instruction processor to demote the texture projective instruction.

18. The computer system of claim 10, further comprising:
using a vertex processing portion of a GPU (graphics processing unit) to determine whether the texture projective parameter is equal to 1 across the polygon.

19. A graphics processing unit, comprising:
a front end for receiving raw graphic data;
a geometry engine for organizing said raw graphics data into geometric primitives;
a rasterizer for converting said geometric primitives into rasterized pixel data; and
a programmable shader for shading said rasterized pixel data, wherein said shader is configured to demote texture projective instructions of a shader program when a parameter of the texture projective instructions of the shader program indicates a non-projective texture and execute a plurality of resulting demoted texture instructions using a plurality of interpolators of the shader, wherein the plurality of demoted texture instructions are executed in place of respective corresponding texture projective instructions.

20. The graphics processing unit of claim 19, wherein the texture projective instructions are TXP instructions and the resulting demoted texture instructions are TEX instructions.

21. The graphics processing unit of claim 19, wherein the non-projective texture is indicated when the parameter is equal to 1 across a polygon.

* * * * *